May 21, 1963    J. W. SCHNELLER    3,090,471
FURRED WALL CONSTRUCTION
Filed June 15, 1959

INVENTOR
Joseph W. Schneller
BY Popp and Sommer
ATTORNEY

United States Patent Office 3,090,471
Patented May 21, 1963

3,090,471
FURRED WALL CONSTRUCTION
Joseph W. Schneller, Eggertsville, N.Y., assignor to National Gypsum Company, Buffalo, N.Y., a corporation of Delaware
Filed June 15, 1959, Ser. No. 820,154
2 Claims. (Cl. 189—35)

This invention relates to an improvement in furred wall construction, and more particularly to a furring clip for securing a furring member such as a nailing channel to a supporting member such as a masonry wall.

In accordance with conventional, furred masonry wall construction, it is common practice to secure the nailing channel to the wall by stud nails embedded in the wall on each side of the nailing channel and connected by one or more wires fastened to the stud nails and passing over the exposed face of the channel. The principal objection to this type of furring is that the wire passing over the exposed face of the nailing channel creates an uneven surface for the plaster lath or the like subsequently applied to the channel with resulting uneven interior wall construction. In addition, this type of furred wall construction involves unnecessary labor in view of the difficulty involved in maintaining the nailing channel in proper position not only during fastening of the wire but thereafter.

Accordingly, it is the principal object of this invention to overcome these various disadvantages by eliminating the use of such wire for securing the channel to the masonry wall and employing a clip in place thereof, which clip does not obstruct the exposed surface of the nailing channel, is easily assembled with the nailing channel as well as being readily fastened to the masonry wall, and which clip facilitates securing the nailing channel to the wall in proper position as well as maintaining the proper positioning of the channel.

Another object is to provide a furring clip which is flexible, and thereby readily adapted for use with any type of masonry wall, including poured concrete or block walls, regardless of the uneven surface of the wall.

Another object is to provide an improved clip which is strong, yet light in weight, economical to manufacture, and simple in construction.

Other objects and advantages of the invention will become apparent upon consideration of the following specification and drawing in which.

Figure 1:
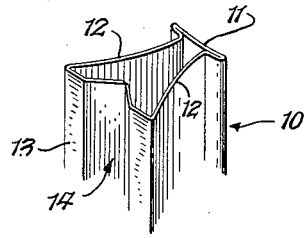
FIG. 1 is a partial perspective view of a preferred embodiment of a nailing channel employed in the practice of the present invention.

Referring to the drawing, the nailing channel is generally indicated at 10 and is preferably fabricated from suitable sheet metal such as 25 gauge electro-galvanized steel. This metal sheet is bent to shape in order to provide a slightly concave and elongated marginal flange portion 11 located at the rear side of and coextensive with the remainder of the channel, the sides 12 of the channel diverging in smooth concave arcs toward its front face 13. This front face is provided with a depressed V-shaped recess 14 extending longitudinally of the channel and which is formed by the abutting bent ends of the sheet metal. The recess 14 is provided for receiving the usual nails (not shown) for securing plaster lath or the like (not shown) to the channel. While this channel is shaped much like those of conventional construction, it differs therefrom primarily in the concavity of the flange portion 11 and walls 12, as well as in the increased width of the flange portion, whereby the channel is especially adapted for use with the inventive clip.

Figure 2:
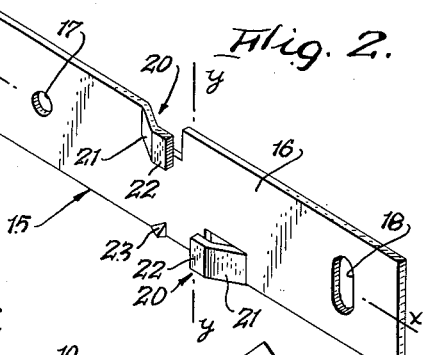
FIG. 2 is a perspective view of an improved clip constituting a preferred embodiment of the invention.

As seen in FIG. 2, a preferred embodiment of the inventive clip is generally indicated at 15 and is preferably fabricated from suitable sheet metal such as 16 gauge electro-galvanized steel to form an elongated substantially rectangular base plate or portion 16 having a circular hole 17 adjacent one end and an elongated, transverse slot 18 adjacent the opposite end. Intermediate the ends of base plate 16 there is provided a pair of elongated, opposed ears generally indicated at 20, and which ears are struck out from the base plate 16 adjacent its longitudinal edges and extend laterally from one and the same side thereof. Ears 20 which are offset and spaced apart on opposite sides of the central longitudinal axis x—x of base plate 16, project toward each other generally axially of this axis, and each ear preferably includes an elongated, substantially rectangular inner portion 21 bent at an acute angle with the adjacent side of the base plate 16 and a substantially rectangular free outer portion 22 bent substantially parallel to the aforesaid adjacent side of the base plate.

Figure 3:
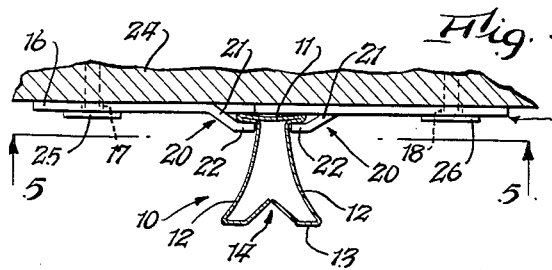
FIG. 3 is a top view, partly in section, of an installation including the nailing channel of FIG. 1 and the clip of FIG. 2 assembled together and fastened to a masonry wall.
Figure 5:
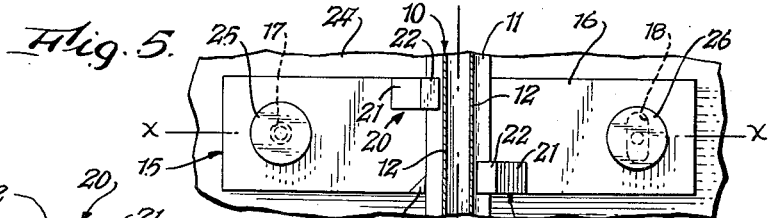
FIG. 5 is a similar view illustrating these elements after assembly.
Figure 6:
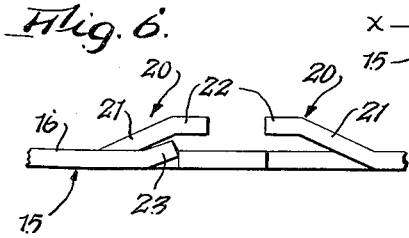
FIG. 6 is an enlarged fragmentary view of the bottom of the clip shown in FIGS. 2–5.

As also seen in FIGS. 3, 5 and 6, the free ends of outer portions 22 of ears 20 generally face and are spaced apart equally on opposite sides of the central transverse axis y—y of base plate 16 extending perpendicular to axis x—x, and these outer ear portions overlie flange portion 11 of channel 10. Located substantially opposite one of ears 20 (the lowermost ear as illustrated in FIG. 2) is a preferably triangularly shaped tab 23 which, like each ear 20, is struck out from base plate 16 adjacent its longitudinal edge and extends laterally from the same side thereof. This tab 23 is spaced on the opposite side of the central transverse axis y—y of base plate 16 from the corresponding ear 20 and has a free end facing such ear, all for a purpose to be described below.

Figure 4:
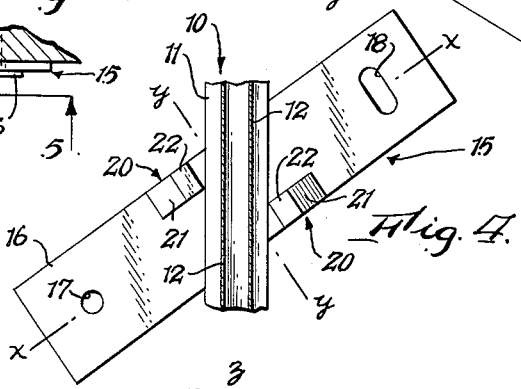
FIG. 4 is a partial elevational view of the channel of FIG. 1 and the clip of FIG. 2 in the process of being assembled.

As previously stated, the outer portions 22 of ears 20 are spaced apart and overlie the flange portion 11 of clip 10. However, as seen in FIG. 5, this spacing, when measured parallel to axis x—x, is less than the overall width of the flange portion but greater than the outer span of sides 12 adjacent the flange portion. Thus, in order to assemble the channel 10 and clip 15, they are simply tilted or cocked relative to each other so that the rear face of flange portion 11 can pass freely between the outer portions 22 of ears 20, as the spacing between the nearmost corners of these portions, when measured on a diagonal, preferably 45°, to either axis x—x or y—y is slightly greater than the width of flange portion 11 as shown in FIG. 4. Once this is accomplished, the clip 15 is then rotated to a position substantially perpendicular to the longitudinal axis z—z of channel 10, as seen in FIG. 5, in order to provide positive interengagement of the extra wide flange portion 11 with the adjacent side of base plate 16 and the overlying outer portions 22 of ears 20, as the shortest distance between outer portions 22 and base plate 16 is slightly less than the concavity of flange portion 11 adjacent sides 12. Thus, the flange portion 11, which is of lighter gauge and less thickness, even where doubled over, than that of clip 10, is wedged between outer portions 22 and base plate 16. Even though flange portion 11 tends to flatten out in the process, its inherent resiliency creates a positive mechanical pressure between these inter-engaging surfaces to prevent free sliding movement therebetween, and thereby facilitates maintaining the clip and channel in proper position relative to each other.

As soon as the clip and channel are in proper position, the free end of tab 23, which has previously been bent outwardly from the same side of the base plate 16 as ears 20 during fabrication of the clip, snaps into engagement with the corresponding marginal edge of flange portion 11. The spacing between tab 23 and the corresponding outer ear portion 22 is such as to permit this positive engagement, and the above mentioned flexibility of the resilient flange portion 11 permits it to ride over the tab 23 during the aforesaid positioning operation. This tab provides additional assurance in the form of a positive mechanical lock, in order to prevent any undesirable tilting or cocking of the channel 10 and clip 15 relative to each other, especially if one or the other of these elements is accidentally struck, as when installing the assembly on a wall.

Once this assembly is completed, the clip 15 is then nailed to the masonry wall 24 by the usual stud nails 25, 26 passing through openings 17 and 18 respectively. In order to facilitate this nailing operation, the stud nail 25 is first passed through circular opening 17 and embedded in masonry wall 24, after which the clip can be then adjusted angularly to locate the nailing channel 10 in the proper position, before the second stud nail 26, which passes through slot 18, is embedded in wall 24.

Figure 7:
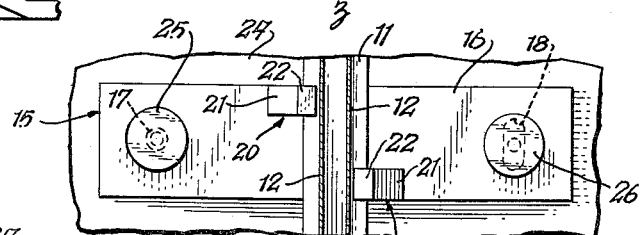
FIG. 7 is a view similar to FIG. 5, but illustrating a modification of the inventive clip.

The modified inventive clip shown in FIG. 7 is exactly the same as that shown in FIG. 2, except that the tab 23 has been eliminated. Instead of utilizing the tab 23 as additional assurance against tilting or cocking of the channel 10 relative to clip 15, the positive interengagement between the abutting surfaces thereof is ordinarily sufficient for this purpose. However, the use of tab 23 is preferred because of the positive lock provided thereby.

Figure 8:
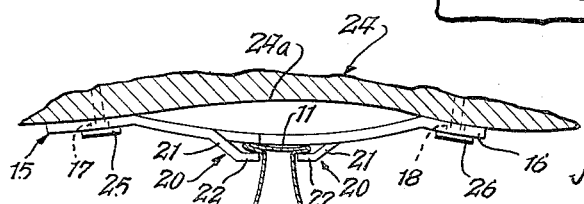
FIG. 8 is a view similar to FIG. 3, but illustrates the manner in which the inventive clip is readily adapted for connection to an uneven masonry wall.

Referring to FIG. 8, it will be seen that the clip 15 is flexible. Thus, in the event that it is necessary to secure the nailing channel 10 adjacent a recessed or wavy portion 24a of the wall 24, the base plate 16 can readily be bent so that the ends of the base plate will fit flush against the wall, while the central part of the base plate can be bent outwardly to line up the channel 10 with the adjacent channels (not shown) fastened to an even surface of the wall.

It will now be evident that the inventive clip completely eliminates the use of any channel fastening wire and thus the exposed face 13 of channel 10 will present an even surface for supporting the plaster lath or other interior wall base. It will also be evident how the invention accomplishes its various other objects, as will be the reasons why the invention possesses numerous advantages over prior art practice.

While certain embodiments of this invention have been described herein in detail, it is to be understood that various changes and modifications may be made therein by those skilled in the art without departing from the spirit of the invention, the scope of which is to be determined by the appended claims.

What is claimed is:
1. A clip adapted to secure a furring member to a supporting member, said clip comprising a base portion adapted to be mounted on a supporting member, a pair of opposed ears bent outwardly from one side of said base portion and projecting toward each other generally axially of a first axis of said base portion and being spaced apart on opposite sides of said first axis, with the free ends of said ears generally facing and being spaced apart equally on opposite sides of a second transverse axis of said base portion extending substantially perpendicular to said first axis, said ears being adapted to overlie a portion of a furring member and the spacing between said ears being at least equal to the width of a furring member when measured along a line between the closest adjacent portions of said ears, and a locking tab bent outwardly from said one side of said base portion, said locking tab being arranged substantially opposite one of said ears, being spaced on the opposite side of said second axis from said one ear, and having a free end facing said one ear and adapted to engage an edge of a portion of a furring member, whereby a furring member may be inserted between said ears when tilted to pass between the closest adjacent portions of said ears, and may be received into the spacing between said one side of said base portion and said ears, as well as into locking edgewise engagement with said free end of said tab, when rotated to a position substantially perpendicular to said first axis.

2. A clip adapted to secure an elongated nailing channel having a marginal flange portion to a wall, said clip comprising an elongated base plate adapted to be mounted on said wall, a pair of opposed ears struck out from one side of said base plate and projecting toward each other generaly axially of the central longitudinal axis of said base plate and being spaced apart equally on opposite sides of said longitudinal axis, with the free ends of said ears generally facing and being spaced apart on opposite sides of the central transverse axis of said base plate extending substantially perpendicular to said longitudinal axis, said ears being adapted to overlie the flange portion of a nailing channel and the spacing between said ears being slightly greater than the width of the marginal flange portion when measured along a line between the closest adjacent portions of said ears, and a locking tab struck out from said one side of said base plate, said locking tab being arranged substantially opposite one of said ears, being spaced on the opposite side of said transverse axis from said one ear, and having a free end facing said one ear and adapted to engage a marginal edge of the flange portion, whereby the flange portion may be inserted between said ears when tilted to pass freely between the closest adjacent portions of said ears, and may be received into positive interengagement with said one side of said base plate and said ears, as well as into edgewise engagement with said free end of said locking tab, when rotated to a position substantially perpendicular to said longitudinal axis.

References Cited in the file of this patent
UNITED STATES PATENTS

| | | |
|---|---|---|
| 734,275 | Lyon | July 21, 1903 |
| 2,072,684 | Raynor | Mar. 2, 1937 |
| 2,218,426 | Hurlbert | Oct. 15, 1940 |
| 2,553,363 | Droeger | May 15, 1951 |
| 2,787,037 | Hobbs | Apr. 2, 1957 |
| 2,841,255 | Kemp | July 1, 1958 |